Jan. 10, 1961     C. D. WILLIAMS     2,967,719
TOWING ASSEMBLY FOR BOATS
Filed Oct. 13, 1958
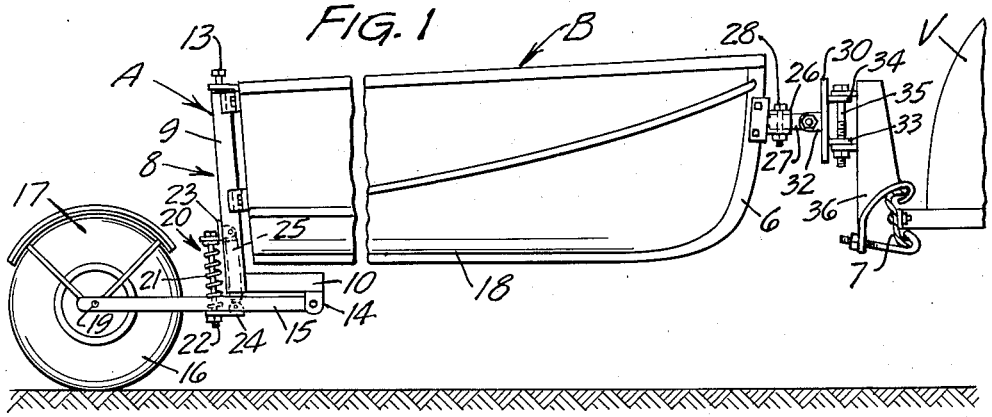
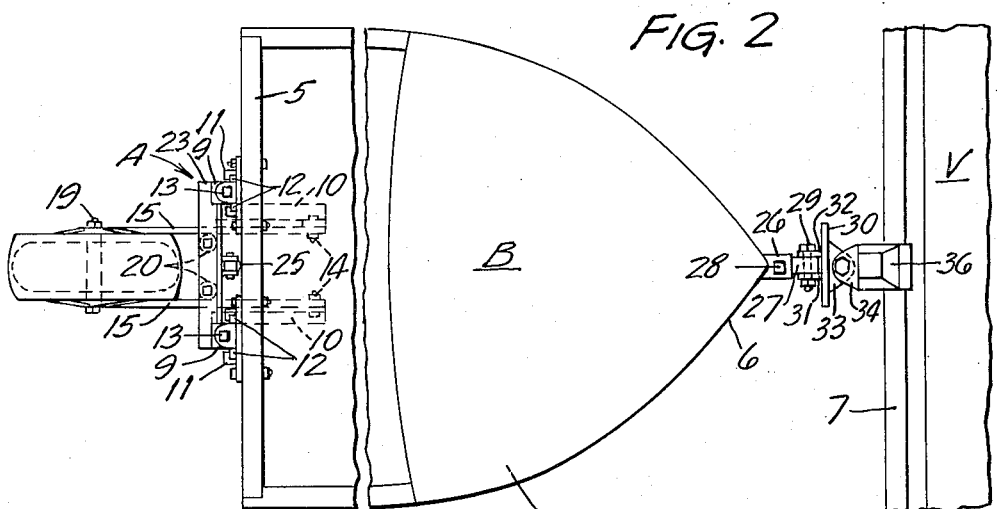
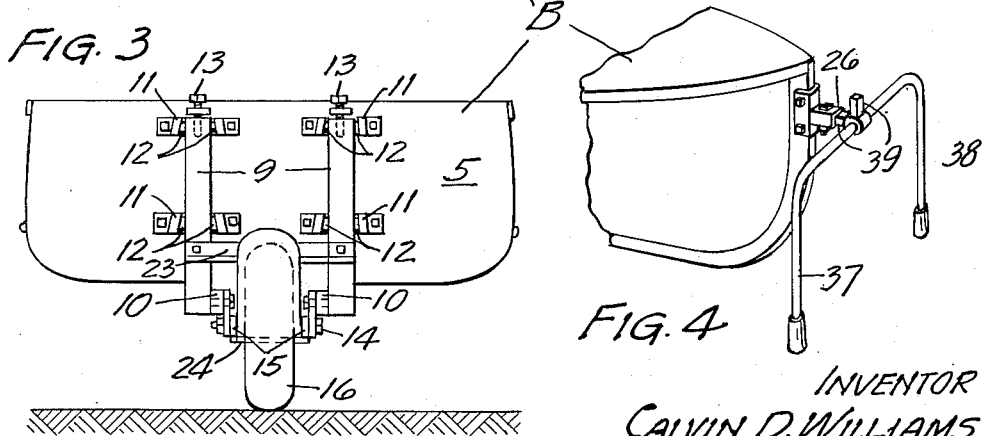
INVENTOR
CALVIN D. WILLIAMS
BY
*Williamson, Schroeder & Palmatier*
ATTORNEYS

United States Patent Office 2,967,719
Patented Jan. 10, 1961

2,967,719

TOWING ASSEMBLY FOR BOATS

Calvin D. Williams, Cloquet, Minn., assignor to Arthur K. Raudio, Embarrass, Minn.

Filed Oct. 13, 1958, Ser. No. 767,027

14 Claims. (Cl. 280—414)

This invention relates to towing assemblies for boats or, as they are more commonly referred to, boat trailers. More particularly, it relates to a towing assembly to be utilized in conjunction with boats and the like whereby the boat may be drawn behind a vehicle in traffic to various points or locations.

It is a general object of my invention to provide a novel and improved towing assembly of simple and inexpensive construction and improved advantages.

A more specific object is to provide novel and improved towing assemblies for boats and the like which is light in weight, inexpensive to manufacture, of small compass, and having increased maneuverability.

Another object is to provide a novel and improved towing assembly which is safer to utilize in that it may be drawn behind a vehicle to the right of the longitudinal center line of the vehicle and in that its construction is such that the entire assembly will not swerve in the event a tire collapses suddenly.

Another object is to provide a novel towing assembly which will not wear upon the bottom of the boat or loosen its rivets or wood strips while in transit.

Another object is to provide a novel and improved towing assembly which does not require that the motor be removed from the boat in order to utilize the assembly and which will carry the boat at a low elevation so as not to interfere with the rear vision of the driver of a vehicle to which the assembly and boat are attached.

Another object is to provide a novel and improved towing assembly for boats which is of such small compass and light weight that it may be utilized for portaging and the like.

These and other objects and advantages of my invention will more fully appear from the following description, made in connection with the accompanying drawings wherein like reference characters refer to the same parts throughout the several views and in which:

Fig. 1 is a side elevational view of one embodiment of my invention being utilized to tow a boat, portions of the boat being broken away;

Fig. 2 is a plan view of the same towing assembly;

Fig. 3 is a rear elevational view of the same; and

Fig. 4 is a fragmentary perspective view of the front end of the boat supported by a handle assembly secured in the hitch socket on the boat.

One embodiment of my invention may include as shown in Figs. 1-4, a towing assembly indicated generally by the letter A which is secured to the rear end of a boat indicated generally by the letter B and which in turn is secured in drawn relation to a vehicle indicated by the letter V. Reference to the drawings readily shows that the towing assembly A is preferably secured to the transom 5 of the boat B which, as is conventional, is at the rear end of the boat. The front end 6 of the boat is secured in a manner hereinafter to be described to the bumper 7 of the vehicle V.

The towing assembly, as shown in Figs. 1-4 is comprised of a generally L-shaped frame member indicated generally by the numeral 8. This L-shaped frame member has an upstanding leg member 9 having upper and lower portions and a generally horizontally extending leg member 10 which extends forwardly from the lower end of the upstanding leg 9. As shown, the frame member 8 is comprised of a pair of horizontally spaced upstanding leg members 9 to provide added rigidity but it will be readily understood that a single such leg member 9 could suffice if properly anchored to the transom 5. Similarly, there are two elements which extend forwardly and together comprise the horizontally extending leg 10 as can be best seen in Fig. 2.

Secured to the transom 5 in vertically spaced relation at both the right and left sides of the center of the transom is a pair of downwardly facing socket members each indicated by the numeral 11. These socket members are tapered so as to be wider at their lower ends than at their upper ends as best shown in Fig. 3 and they are open at both their upper and lower ends. As shown in Fig. 3, they may be bolted to the transom 5 to rigidly affix them to that member. These sockets 11 function as engagement members to cooperatively engage corresponding cooperative engagement members 12, a pair of which is carried by each of the upstanding leg members 9. It will be readily appreciated that the cooperative engagement members 12 are also tapered so as to be narrower at the top than at the bottom and as a result they may be readily slid into place from below into the sockets 11 to cooperatively secure the frame 8 to the transom member 5. Locking means 13 may be provided if desired, to insure that the frame 8 will not loosen in place within the sockets 11.

Pivot means 14 is carried in depending relation by the forward end portion of the horizontally extending leg 10. This pivot means 14 is at each side of the frame F and functions to pivotally secure mounting structure 15 to the frame 8. This mounting structure 15 includes a pair of rearwardly extending arms which are free to pivot in a vertical plane about the axis of pivot of the pivot means 14. It will be noted that the mounting structure 15 extends rearwardly from the pivot means 14 and rearwardly of the upstanding leg 8 as well as of the boat B.

Rotatably mounted at the rear end of the mounting structure 15 is a wheel member 16. It will be noted that the uppermore portions indicated by the numeral 17 are disposed at an elevation well above the bottom 18 of the boat B and that the axis of rotation indicated by the numeral 19 of the wheel 16 is at substantially the same level as the level of the bottom 18 of the boat. It will also be noted that the axis of rotation 19 of the wheel 16 is parallel to the axis of pivot of the pivot means 14 and that each of these axes extend transversely of the boat B.

Restraining means indicated generally by the numeral 20 extends between the upstanding leg 9 and the mounting structure 15. As shown, this restraining means includes a pair of compression type spring such as 21 each of which is slidably mounted upon one of a pair of bolts or pins 22. These bolts or pins 22 are fixedly secured at their upper end to a transverse bar 23 which in turn is fixedly secured to the two upstanding leg members 9 as best shown in Figs. 1 and 2. The lower ends of the pins 22 extend through a cross member 24 which is fixedly secured in transverse relation to the two rearwardly extending arms 15 which comprise the mounting structure for the wheel 16. Thus, it can be readily seen that the springs 21 function to restrain the vertical pivotal movement of the wheel 16 about the axis of the pivot means 14, for the springs 21 constantly urge the mounting means 15 downwardly to limit the upward movement of the wheel 16. A shock absorber 25 also extends between the frame 8 and the mounting structure 15. Secured to the front end of the boat B is a socket member 26. This socket member 26 is preferably provided with a rectangularly shaped socket which receives therein a similarly shaped insert member 27. A spring loaded pin 28 is utilized to secure these two elements 26 and 27 together when the insert member 27 is sent home in the socket of the socket member 26. The insert member 27 is pivotally connected for movement about a horizontal axis by a bolt 29 to a plate member 30 which has a pair of rearwardly extending ears 31 and 32 for that purpose. The plate member 30 also has a pair of forwardly extending ears 33 and 34 which are vertically spaced and are pierced by a bolt 35 to connect an upstanding attachment member 36 thereto. The attachment member 36 as best shown in Fig. 1 is a conventional means for securing a bolt or the like to the bumper of a vehicle such as that illustrated in Figs. 1 and 2. It can be seen by reference to Figs. 1 and 2 however, that the elements 26—35 provide a readily detachable connection means through the use of which the front end of the boat may be secured to a draft member 36 and will provide free pivotal movement about a vertical and a horizontal axis but will preclude twisting of the boat B about an axis extending longitudinally thereof.

There is also provided a pair of handle bars shown in Fig. 4 which may be applied to the socket 26 in the same manner as the insert 27. The handle bars indicated by the numerals 37 and 38 are provided at their point of juncture with an insert member 39 which is identical in shape and size to the insert member 26. Thus, if desired, these handle bars may be applied to the front end of the boat to be utilized in assisting in portaging the boat and providing ready draft means whereby the boat may be drawn along the path of portage. It will also be seen that these handle bars function as a support for the front end of the boat when the boat is at rest. This can be readily seen by reference to Fig. 4.

When being utilized to tow a boat, the towing assembly is connected to the boat as shown in Figs. 1–3. It will be noted that the wheel 16 is not swiveled and that a single wheel is utilized in this towing assembly. Because of this, there will be no swerving in the event the tire of the wheel would suddenly collapse as is normally experienced by two wheel trailers when one of the two tires of the trailer suddenly collapses. It should be noted that the towing assembly is extremely simple in construction and inexpensive to manufacture in that substantially less materials are required than for most towing assemblies. The assembly is unusually simple and easy to apply in that it is of light weight and can be connected with a minimum of effort.

One of the most important advantages of my towing assembly is that the extent of vertical movement of the boat which is caused by rocks and the like on the highway is substantially reduced in that my towing assembly is constructed to provide a dampening effect against such vertical movements. In this connection, it should be noted that the axis of rotation of the wheel 16 is disposed rearwardly of the upright members 9 and the transom 5 while the axis of pivot of the mounting structure 15 is disposed substantially ahead of these upright members. Thus, the extent of vertical movement of the boat B will be approximately only half that which is experienced when the conventional towing assemblies are utilized. Such an arrangement substantially reduces the damaging effects caused by poor roads and the like across which boats and their towing assemblies are frequently drawn.

Another advantage of my towing assembly is that it may be secured to the right of the longitudinal center line of the vehicle V, for only a single wheel is utilized and thus the boat and the towing assembly can be drawn behind the vehicle to the right of the center line thereof. This means that the dangers normally attendant with two wheel trailers caused by their tendency to swerve has been obviated and thus, it is substantially safer to draw a boat behind a vehicle such as an automobile when my towing assembly is utilized.

Reference to Fig. 1 will readily show that when my towing assembly is utilized the interference with the vision of the driver of the vehicle is substantailly reduced because the boat B is carried at a substantially lower level than is possible with conventional boat trailers or towing assemblies having the same size wheel. In addition, through the utilization of a single non-swiveled wheel, my towing assembly is made more maneuverable than two wheeled towing assemblies.

Another advantage of my towing assembly is that it does not engage any portion of the bottom of the boat B and hence I have completely obviated the wear to which the bottom of the boat is normally subjected by conventional trailers or towing assemblies. Such towing assemblies, as heretofore known, support the boat, in part at least, through the bottom of the boat and this causes the rivets or wood strips of the boats to be loosened while the boat is in transit.

It will, of course, be understood that various changes may be made in the form, details, arrangement and proportions of the parts without departing from the scope of my invention which consists of the matter shown and described herein and set forth in the appended claims.

What is claimed is:

1. A towing assembly for boats and the like comprising a frame adapted to be secured to one end of a boat, a wheel member, pivotal mounting means rotatably mounting said wheel member and also pivotally mounting said wheel member on said frame for free vertical movement about an axis substantially parallel to the axis of rotation of said wheel member, the axis of rotation and the axis of vertical pivotal movement of said wheel member lying in a common plane disposed substantially normal to a vertical plane extending through the point of securement of said frame when the latter is secured to a boat, and means for restraining the vertical movement of said wheel member when said frame is so secured to a boat.

2. The structure defined in claim 1 wherein the axis of rotation and the axis of vertical pivotal movement of said wheel member are at opposite sides of and parallel to said vertical plane.

3. A towing assembly for boats and the like comprising a generally L-shaped frame having an upstanding leg adapted to be secured to the rear end of a boat and a generally horizontal leg extending forwardly from the lower portion of said upstanding leg, a wheel, mounting structure rotatably mounting said wheel and extending forwardly therefrom, and pivot means pivotally connecting said mounting structure to said horizontal leg at a point ahead of said upstanding leg for pivotal movement about a horizontal transverse axis, and restraining mechanism extending between said mounting structure and said upstanding leg of said frame and restraining the pivotal movement of said mounting structure.

4. The structure defined in claim 3 wherein said wheel is disposed rearwardly of said upstanding leg of said frame.

5. A towing assembly for boats and the like comprising downwardly facing engagement member adapted to be secured to the rear end of a boat, a generally L-shaped frame having an upstanding leg with upper and lower portions and a generally horizontal leg extending forwardly from the lower portion of said upstanding leg, cooperative engaging members carried by said upstanding leg of said frame and adapted to cooperatively engage said engagement members to cooperatively secure said frame to said boat in rigid fixed relation, a wheel, mounting structure rotatably mounting said wheel and extending forwardly therefrom, pivot means pivotally connecting said mounting structure to said horizontal leg ahead of said upstanding leg for free pivotal movement about a horizontal transverse axis extending parallel to the axis of rotation of said wheel, the axis of said wheel being behind said upstanding member, and restraining mechanism extending between said mounting structure and said upstanding leg of said frame and restraining the pivotal movement of said mounting structure.

6. The combination of a boat having a front end and a rear end with a transom, a generally L-shaped frame having an upstanding leg with upper and lower portions, means removably securing the upper portions of said upstanding leg in rigid fixed relation to the transom of said boat, the lower portions of said leg extending to a level beneath said boat, said frame having a horizontal leg extending forwardly from the lower portion of said upstanding leg and beneath the rear end of said boat, a wheel, pivot means carried by said horizontal leg ahead of said upright leg and beneath said boat, mounting structure pivotally secured to said horizontal leg by said pivotal means and extending rearwardly therefrom to a point a substantial distance rearward of the rear end of said boat, said wheel being rotatably mounted on said mounting structure a substantial distance rearward of said boat, the axis of rotation of said wheel and the axis of pivotal movement of said mounting structure being parallel and extending horizontally and transversely of said boat, and resilient restraining mechanism extending between said mounting structure and said upstanding leg of said frame and restraining the pivotal movement of said mounting structure.

7. The structure defined in claim 6, and mechanism secured to the front end of said boat for supporting the same in drawn relation and for preventing said boat from twisting about an axis extending longitudinally thereof.

8. The structure defined in claim 6, and mechanism secured to the front end of said boat supporting the same in drawn relation and preventing said boat from twisting about an axis extending longitudinally thereof, said mechanism including a socket member having a polygonally shaped socket therein and a corresponding shaped readily detachable insert member received therein.

9. The structure defined in claim 6 wherein the axis of rotation of said wheel is on substantially the same level as the bottom of said boat and the upper portions of said wheel are disposed above the lowermost portions of said boat.

10. The structure defined in claim 6 wherein the axis of pivot of said pivot means and the axis of rotation of said wheel are substantially equidistant from the lower portion of said upright leg of said frame.

11. The combination of a boat having a front end and a rear end, a frame having a portion thereof secured to one of said ends, a wheel, mounting structure rotatably mounting said wheel, means pivotally securing said mounting structure to said frame for vertical movement of said wheel about an axis parallel to the axis of rotation of said wheel, the axis of rotation and the axis of pivotal movement of said wheel lying in a plane substantially normal to a vertical plane extending through the point of securement of the frame and boat, restraining mechanism extending between said mounting structure and frame for restraining vertical movement of said wheel member, and mechanism secured to the other end of said boat for securing the same in drawn relation to a vehicle, said mechanism including means for preventing said boat from twisting about an axis longitudinally of said boat.

12. The structure defined in claim 11 wherein the axis of vertical pivotal movement of said wheel is ahead of and the axis of rotation of said wheel is behind said portion of said frame secured to a boat.

13. A towing assembly for boats and the like comprising a generally L-shaped frame having an upstanding leg adapted to be secured to the rear end of a boat and a generally horizontal leg extending forwardly from the lower portion of said upstanding leg, a wheel, mounting structure rotatably mounting said wheel and extending forwardly therefrom, and pivot means pivotally connecting said mounting structure to said horizontal leg at a point ahead of said upstanding leg for pivotal movement about a horizontal transverse axis, and restraining mechanism extending between said mounting structure and said frame and serving to restrain pivotal movement of said mounting structure.

14. The combination of a boat having a front end and a rear end, a frame having a portion thereof secured to one of said ends, a wheel, mounting structure rotatably mounting said wheel, means pivotally securing said mounting structure to said frame for vertical movement of said wheel about an axis parallel to the axis of rotation of said wheel, the axis of rotation and the axis of pivotal movement of said wheel lying in a plane substantially normal to a vertical plane extending through the point of securement of the frame and boat, restraining mechanism extending between said mounting structure and frame for restraining vertical movement of said wheel member, and mechanism secured to the other end of said boat for securing the same in drawn relation to a vehicle, said mechanism including means for preventing said boat from twisting about an axis longitudinally of said boat, said last mentioned means including a pivotal connection permitting movement about a vertical axis and a second pivotal connection permitting movement about a horizontal axis, said first mentioned pivotal connection of said means being disposed ahead of said second mentioned pivotal connection of said means.

References Cited in the file of this patent

UNITED STATES PATENTS

| | | |
|---|---|---|
| 1,376,496 | Woodruff | May 3, 1921 |
| 2,455,048 | DuBrie | Nov. 30, 1948 |
| 2,489,705 | DuBrie | Nov. 29, 1949 |
| 2,548,274 | Van Oeveren | Apr. 10, 1951 |
| 2,792,232 | Elmore | May 14, 1957 |

FOREIGN PATENTS

| | | |
|---|---|---|
| 127,772 | Australia | May 17, 1948 |
| 141,679 | Australia | June 19, 1951 |